United States Patent
Zhong et al.

(10) Patent No.: US 9,948,045 B2
(45) Date of Patent: Apr. 17, 2018

(54) AUDIO/VIDEO SIGNAL TRANSMISSION CONNECTOR

(71) Applicant: AMLOGIC (SHANGHAI) CO., LTD., Shanghai (CN)

(72) Inventors: John Zhong, Shanghai (CN); Kevin Chen, Shanghai (CN); Shaohua Huang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/321,917

(22) PCT Filed: Oct. 27, 2015

(86) PCT No.: PCT/CN2015/092902
§ 371 (c)(1),
(2) Date: Dec. 23, 2016

(87) PCT Pub. No.: WO2016/070735
PCT Pub. Date: May 12, 2016

(65) Prior Publication Data
US 2017/0237214 A1    Aug. 17, 2017

Related U.S. Application Data

(60) Provisional application No. 62/077,236, filed on Nov. 8, 2014.

(30) Foreign Application Priority Data

Apr. 13, 2015    (CN) .......................... 2015 1 0174057

(51) Int. Cl.
*H01R 27/02*    (2006.01)
*H04N 21/4363*    (2011.01)
(Continued)

(52) U.S. Cl.
CPC ............. *H01R 27/02* (2013.01); *H01R 24/64* (2013.01); *H04N 21/426* (2013.01);
(Continued)

(58) Field of Classification Search
CPC .......................... H01R 2201/18; H01R 27/02
See application file for complete search history.

(56) References Cited

U.S. PATENT DOCUMENTS 7,850,490 B2 * 12/2010 Hunkins .............. H01R 12/712
439/108
8,308,515 B2    11/2012 Chang
(Continued)

FOREIGN PATENT DOCUMENTS

CN    2538080 Y    2/2003
CN    201584585 U    9/2010
(Continued)

OTHER PUBLICATIONS

International Search Report for International Patent Application No. PCT/CN2015/092902, dated Feb. 1, 2016, 6 pages.

*Primary Examiner* — James Harvey
(74) *Attorney, Agent, or Firm* — Withrow & Terranova, PLLC

(57) ABSTRACT

The audio/video signal transmission connector provided in this application, relates to the field of TV; use partition and integration arrangement corresponding to the audio-video signal transmission connector in TV, so as to avoid interference among each zone, and make the connecting end faces of the interface in each zone locate in the same horizontal plane, so as to make the connector easier to plug the other components, and the connection are reliable and not easy to loose, meanwhile it is benefit for welding procedure.

19 Claims, 3 Drawing Sheets

(51) Int. Cl.
   *H04N 21/426* (2011.01)
   *H01R 24/64* (2011.01)
   *H01R 107/00* (2006.01)

(52) U.S. Cl.
   CPC ... *H04N 21/43635* (2013.01); *H01R 2107/00* (2013.01); *H01R 2201/18* (2013.01)

(56) References Cited

U.S. PATENT DOCUMENTS

| | | | | |
|---|---|---|---|---|
| 9,705,234 B2* | 7/2017 | Flender | ............ | H01R 13/502 |
| 2006/0286825 A1* | 12/2006 | Ho | ............ | H01R 23/6873 |
| | | | | 439/65 |
| 2008/0188136 A1* | 8/2008 | Su | ............ | H01R 27/02 |
| | | | | 439/660 |
| 2008/0212275 A1* | 9/2008 | Waryck | ............ | H01R 27/02 |
| | | | | 361/679.44 |
| 2011/0306242 A1* | 12/2011 | Zhang | ............ | H01R 13/6658 |
| | | | | 439/607.01 |
| 2012/0003852 A1* | 1/2012 | Chang | ............ | H01R 12/73 |
| | | | | 439/83 |
| 2013/0058012 A1* | 3/2013 | Ballard | ............ | H02G 3/18 |
| | | | | 361/622 |
| 2013/0059479 A1* | 3/2013 | Ho | ............ | H01R 27/02 |
| | | | | 439/639 |
| 2013/0265384 A1* | 10/2013 | Shoemake | ............ | H04N 7/15 |
| | | | | 348/14.08 |
| 2014/0078020 A1* | 3/2014 | Yamada | ............ | G06F 3/147 |
| | | | | 345/1.1 |
| 2014/0302920 A1* | 10/2014 | Beckett | ............ | A63F 13/00 |
| | | | | 463/31 |
| 2017/0201706 A1* | 7/2017 | Zhong | ............ | H04N 5/4403 |
| 2017/0237214 A1* | 8/2017 | Zhong | ............ | H01R 27/02 |
| | | | | 439/639 |

FOREIGN PATENT DOCUMENTS

| | | |
|---|---|---|
| CN | 201868594 U | 6/2011 |
| CN | 202205997 U | 4/2012 |
| CN | 203288900 U | 11/2013 |
| CN | 104577587 A | 4/2015 |
| CN | 204349140 U | 5/2015 |
| CN | 104795700 A | 7/2015 |

* cited by examiner

AUDIO/VIDEO SIGNAL TRANSMISSION CONNECTOR

CROSS-REFERENCE TO RELATED APPLICATIONS

This application is a 35 U.S.C. § 371 national phase filing of International Application No. PCT/CN2015/092902, filed Oct. 27, 2015, and claims priority to and the benefit of Chinese Patent Application No. CN 201510174057.8, filed on Apr. 13, 2015, and of US Provisional Patent Application No. 62/077,236, filed on Nov. 8, 2014, the disclosures of which are hereby incorporated herein by reference in their entireties.

BACKGROUND OF THE INVENTION

1. Field of the Invention

The invention relates to the field of TV, more particularity, to an audio-video signal transmission connector.

2. Description of the Related Art

In the modern society, TV as an important audio-visual information source, with the advancing technology, especially with the rapid development of Internet technology, TV has become the core device of intelligent home, and attracts more and more attention.

Nowadays, for the TVs on the market, due to the connectors used for transmitting has low integration, result in that they have similar function, meanwhile when the whole structures thereof connect with the other parts, the structures are easy to loose, and then cause a poor contact; during production, as smoothness of device is difficult to control which leads to head back down or deviation, and it is so difficult to welding repair that it is not appropriate to weld and it is difficult to control the welding quality.

In addition, the connector used for transmitting in current TV has limited ability to adapt advanced performance signal transmission (generally only supporting 18 Gbps signal output), meanwhile it has no partition design, and its anti-serial-interface performance and conductibility (generally supporting a maximum 1 A current transmission) are not strong, then it is unable to expand.

SUMMARY OF THE INVENTION

Aimed at the above-mentioned problems existing in the prior art, this invention provides an audio-video signal transmission connector, which can be applied to audio-video signal transmission, the audio-video signal transmission connector is provided with a connection port for connecting to the other component, and the connection port comprises:

multiple connecting zones, the adjacent connecting zones all being provided with a signal isolation layer, so as to isolate the electrical signal between the connecting zones, wherein, each of the connecting zones comprises at least one interface unit.

As a preferably embodiment, wherein, the connecting end faces of the multiple connecting zones are all located in the same horizontal plane.

As a preferably embodiment, wherein, the multiple connecting zones comprises:

a first connecting zone, comprising a first HDMI interface unit, a second HDMI interface unit and a USB interface unit, a second connecting zone, comprising a power interface unit, an RJ interface unit and other interface units, wherein, the first connecting zone and the second connecting zone are arranged in parallel and axial symmetry, any two between the second connecting zone, the first HDMI interface unit, the second HDMI interface unit, and the USB interface unit and the second connecting zone are isolated from each other by the isolation layer.

As a preferably embodiment, wherein, the first HDMI interface unit and the second interface unit both comprises:

at least one HDMI 2.0 interface, and each HDMI 2.0 interface is compatible with standard data transmission of HDMI 1.4.

As a preferably embodiment, wherein, the bandwidths of the signal transmitted by the first HDMI interface unit and the second HDMI interface unit is both less than or equal to 27 Gbps.

As a preferably embodiment, wherein, he USB interface unit comprises: at least one USB 3.0 interface, and each USB 3.0 interface is compatible with standard data transmission of multiple USB 2.0.

As a preferably embodiment, wherein, the power interface unit comprises:

at least one power interface unit, and each power interface unit is provided with multiple pins, wherein, current of each of the pins of the power interface unit is less than or equal to 1.2 A.

As a preferably embodiment, wherein, the RJ interface unit comprises: at least one gigabit network interface, and each gigabit network interface is compatible with 100 M network standard data transmission.

As a preferably embodiment, wherein, the other interface unit comprises: an analog signal interface, configured to transmit analog signal.

As a preferably embodiment, wherein, the connection port is a female connection port or a male connection port.

As a preferably embodiment, wherein, each interface unit comprises multiple pins, that pins located in the same interface unit and function between two adjacent pins can be replaced mutually.

As a preferably embodiment, wherein, the connection interface comprises 86 pins.

As a preferably embodiment, wherein, the first HDMI interface unit and the second HDMI interface unit are both comprise 18 consecutively arranged pins, the USB interface unit comprises 10 consecutively arranged pins, the power interface unit comprises 7 consecutively arranged pins, the RJ interface unit comprises 11 consecutively arranged pins, and the other interface units comprise 22 consecutively arranged pins.

As a preferably embodiment, wherein, the first HDMI interface unit, the second HDMI interface unit, the USB interface unit, the power interface unit, the RJ interface unit and the other interface units comprise multiple pins, functions of two adjacent pins located in a same interface unit can be replaced mutually.

As a preferably embodiment, wherein, the HDMI 2.0 interface comprises multiple pins, functions of two adjacent pins located in a same interface unit can be replaced mutually.

As a preferably embodiment, wherein, the USB 3.0 interface comprises multiple pins, functions of two adjacent pins located in a same interface unit can be replaced mutually.

As a preferably embodiment, wherein, the connection interface comprises 86 pins.

As a preferably embodiment, wherein, the connection interface comprises 86 pins.

As a preferably embodiment, wherein, the connection interface comprises 86 pins.

As a preferably embodiment, wherein, each interface unit comprises multiple pins, functions of two adjacent pins located in a same interface unit can be replaced mutually;

the female connection port or the male connection port connection interface comprises 86 pins.

Wherein, the first HDMI interface unit and the second HDMI interface unit are distributed symmetrically on two sides of the USB interface unit, the power interface unit and the RJ interface are distributed on two sides of the other interface units, and the first connect zone is arranged parallel to the second connect zone.

The above technical scheme has the following advantages or beneficial effects:

The technical scheme of the application use partition and integration arrangement corresponding to the audio-video signal transmission connector in TV, so as to avoid interference among each zone, and make the connecting end faces of the interface in each zone locate in the same horizontal plane, so as to make the connector easier to plug the other components, and the connection are reliable and not easy to loose, meanwhile it is benefit for welding procedure.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
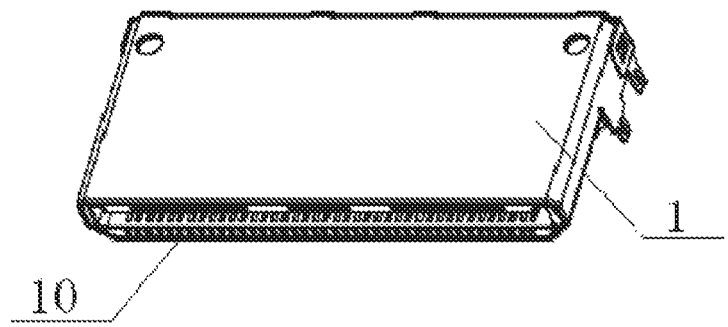
FIG. 1 is a three-dimensional structure diagram of the male connection port of the audio-video signal transmission connector in the embodiment.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" and "multiple" means a number greater than one.

Hereinafter, certain exemplary embodiments according to the present disclosure will be described with reference to the accompanying drawings.

The audio-video signal transmission connector in embodiments of the application may be on the basis of applying to the present audio-video connection line of TV, and configures multiple connecting unit zones through connect components of connectors, also is provide with a isolation layer for isolating electronic signal between the adjacent connecting zones, and the end structure of the connector is configured in axial symmetry, and the connecting end faces of the connecting zones are located in the same horizontal plane, so as to effectively avoid signal interference and cross-talk in the connector, and suitable for blinding mating, and further improve contact performance between the connector and the other component; at the same time, it is beneficial to the production and maintenance of the products.

In this application, the audio-video signal transmission connector is provided with a male connection port and a female connection port, as corresponding mating ends, and the structures of the connection ports are mutual matching, together with the description and the figures, serve to explain the male connection port and the female connection port of the audio-video transmission connector.

Embodiment 1

FIG. 1 is a three-dimensional structure diagram of the male connection port of the audio-video signal transmission connector in the embodiment; as shown in FIG. 1, the audio-video signal transmission connector 1 in this embodiment is provided with a male connection port 10, and can connect to the other components through the connection devices such as connection cable, and the above connection cable can be integrated into a bus wire, and may also set each line separately based on actual needs, as long as it can complete the transmission of digital signal and electric energy; meanwhile, it may also set the connection cable to be flexible or static forms of structures according to actual needs; if the audio-video signal transmission connector is a plug-in card between the components, the connection cable may be integrated in a housing with a certain hardness, so as to make it has certain supporting capacity.

Preferably, the above mentioned connection cable may comprises multiple connection lines (not shown in figure), and each connection line all comprises a protective layer with insulation and/or isolation functions, so as to prevent connection lines from interfering and short-circuit etc. with each other, and the texture and pattern of each core of the connection lines can be provided according to function of the pins in the connection end; such as core of the connection line with the capability of transmitting power may be copper, iron and other conductive materials, and the core of the connection line used to transmit optical signal may be optical fibre etc.

It should be noted that the above connection cable may be set its external structure according to actual needs, as long as it can complete the transmission (including photovoltaic data, electric power transmission etc.) between the connected components.

The above mentioned male connection port 10 may comprises plurality connecting zones, and a isolation layer is arranged between the adjacent connecting zones, which is that the isolation layer isolates the electric signal between the adjacent connecting zones, to prevent different connecting zone from signal interference or cross-talk, so as to ensure the data transmission accurately and safety; wherein, each connecting zone all comprises at least one interface unit, and each interface unit is able to achieve one or more functions.

Figure 2:
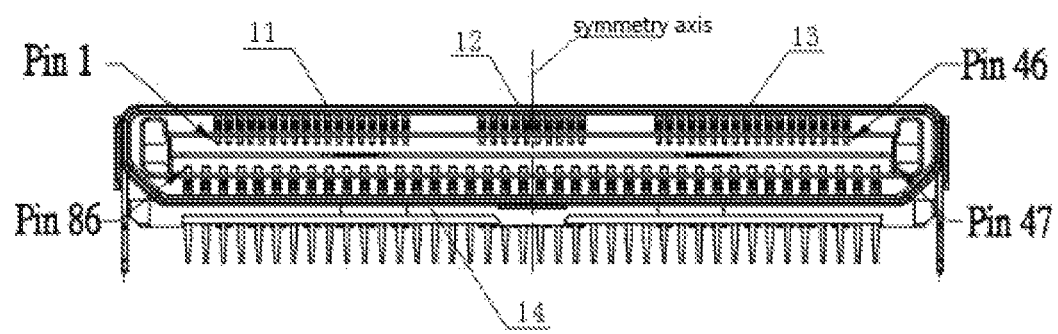
FIG. 2 is a structure diagram of the male connection port of the audio-video signal transmission connector in FIG. 1.
Figure 7:
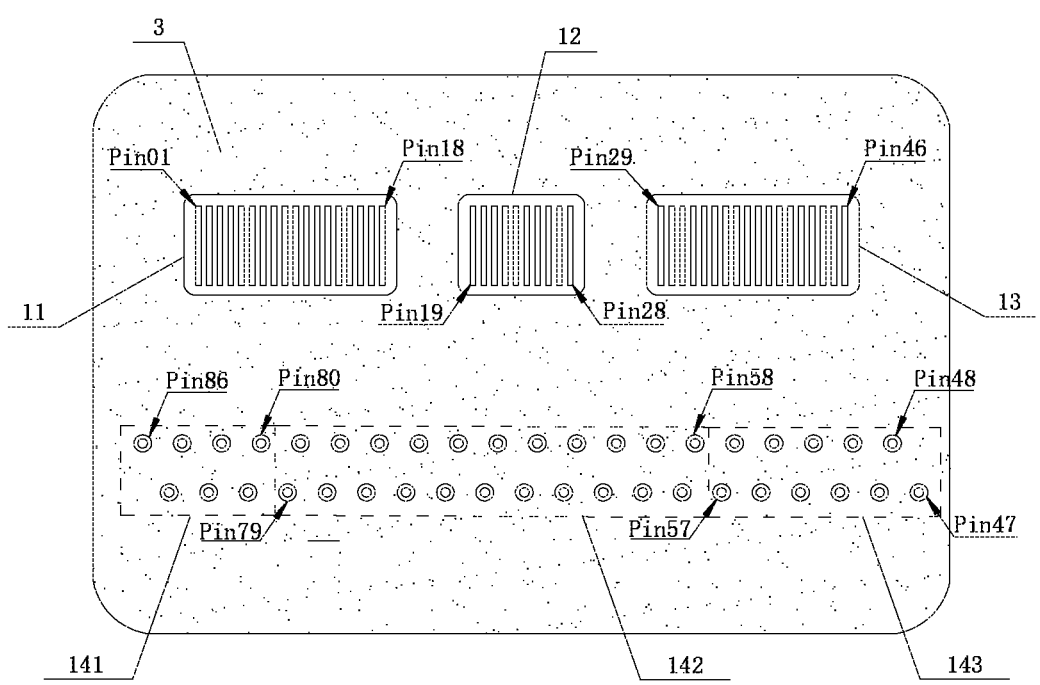
FIG. 7 is a schematic diagram of the isolation layer in the male connection port in the embodiment.

FIG. 2 is a structure diagram of the male connection port of the audio-video signal transmission connector in FIG. 1, FIG. 7 is a schematic diagram of the isolation layer in the male connection port in the embodiment; as shown in FIGS. 2 and 7, in this embodiment, the above male connection port 10 comprises the first connecting zone (not shown) and the second connecting zone 14, and the first connecting zone comprises the first HDMI interface unit 11, the second HDMI interface unit 13 and a USB interface unit 12 and so on; the second connecting zone 14 comprises the power interface unit 141, RJ interface unit 143 and other interface unit 142 and so on.

Wherein, the first HDMI interface unit 11 and the second HDMI interface unit 13 are separately located on two sides of the USB interface unit 12, and the power interface unit 141 and the RJ interface unit 143 are separately located on two sides of the other interface unit 142, and the pins in the male connection port 10 are symmetrical with axis (i.e. the common axis of the first connecting zone and the second connecting zone, and also the axis of the USB interface unit 12) in the FIG. 2, so as to make the connection port of the audio-video signal transmission connector able of blind mating.

Preferably, as shown in FIG. 7, any two of the first HDMI interface unit 11, the second HDMI interface unit 13, the USB interface unit 12 and the second connecting zone 14 are isolated from each other by the isolation layer 3, so as to effectively prevent signal cross-talk and interference from each other; wherein, the material of the signal isolation layer 3 can be adjusted adaptability based on transmitted signal, as long as the signal between the adjacent connecting zones is isolated, to prevent signal cross-talk and interference from each other; for instance, the signal isolation layer 3 may has fire-proof, anti-breakdown, and has certain hardness and flexibility, so as to support and protect the provided pins.

Further, the above mentioned first connecting zone, wherein, the first HDMI interface unit 11 and the second HDMI interface unit 13 all comprise at least one HDMI 2.0 interface, and each HDMI 2.0 interface is available for standard data transmission of HDMI 2.0, also is compatible with standard data transmission of HDMI 1.4, and the HDMI 2.0 interface is available for maximum 27 Gbps data transmission; the above mentioned USB interface unit 12 further comprises at least one USB 3.0 interface, and each USB 3.0 interface is available for standard data transmission of USB 3.0, and also compatible with standard data transmission of USB 2.0.

Further, the above mentioned second connecting zone 14, wherein, the power interface unit 141 may also comprises at least one power interface unit, and each power interface unit is provided with multiple pins, wherein, current in each pin of the power interface unit is less than or equal to 1.2 A, for instance, based on the traditional power interface, 1.2 A current transmission can be achieved by increasing pins or using high conductive material or other techniques; the RJ interface 141 further comprises at least one gigabit network interface, and each gigabit network interface is compatible with standard data transmission of 100 M network; the above other interface unit comprises, such as, an analog signal interface, configured to be used for the analog signal transmission and other auxiliary interface, and specifically, arrangement and adjustment can be made according to the specific requirements of data transmission between the connection device.

Preferably, the above power interface unit 141 and RJ interface 143 are all provided with multiple pins, and the function of the pins located in the power interface unit 141 and RJ interface 143 can be adjusted according to actual needs, as long as the power interface unit 141 can realize electronic transmission, and RJ interface have internet connection.

Further, the above mentioned male connection port 10 is further configured with multiple pins arranged in specific rule, each of interface unit is configured with multiple pins, and pins located in the same interface unit and between the functions of two adjacent pins can be replaced mutually.

Figure 3:
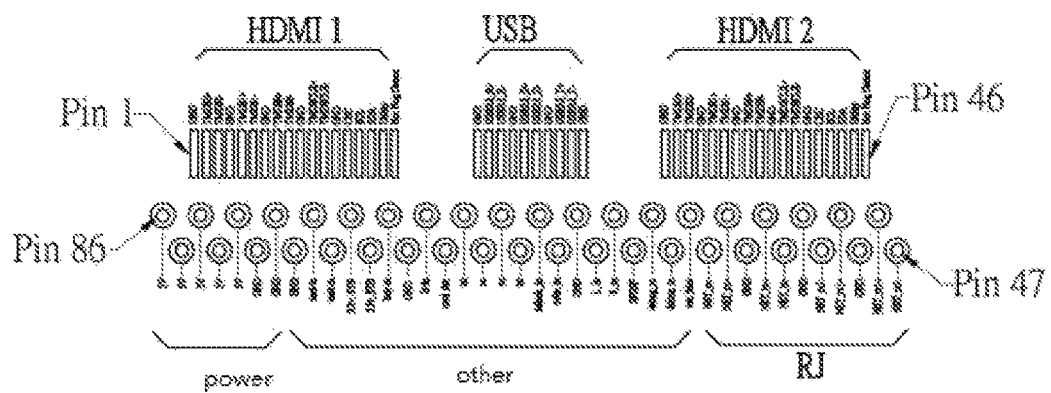
FIG. 3 is a schematic diagram of the pins of the male connection port in FIG. 1 and/or FIG. 2.

FIG. 3 is a schematic diagram of the pins of the male connection port in FIG. 1 and/or FIG. 2; as shown in FIGS. 1-3 and FIG. 7, the connection interface comprising 86 pins is taken as an example, and is described in detail as follows:

Referring to FIGS. 2, 3 and 7, the above mentioned the first HDMI interface unit 11 and the second HDMI interface unit 13 all comprise 18 consecutively arranged pins (pin01-pin08, pin29-pin46), the USB interface unit comprises 10 consecutively arranged pins (pin19-pin28), the power interface unit comprises 7 consecutively arranged pins (pin76-pin86), the RJ interface unit 143 comprises 11 consecutively arranged pins (pin47-pin57), the other interface units 142 comprise 22 consecutively arranged pins (pin58-pin75); i.e. the pins (pin01-pin46) located in the first connecting zone are arranged into a column, and the distance between the adjacent pins in different interface unit is the same; and the pins (pin47-pin86) located in the second connecting zone 14 are located under the above mentioned first connecting zone, and the pins between the second connecting zone 14 are arranged into two rows according to the same interval and arrangement rule; referring to FIG. 2 and FIG. 7, the pins (pin01-pin86) in the male connection port 10 are all symmetrical distributed with the axis.

Preferably, any two pins (such as contact pins) located in the same interface unit can be replace mutually, to achieve the switching between different functions, and improving the flexibility and expansivity of the connecting end faces; meanwhile, the connecting end faces of the pins in the connecting interface are located in the same horizontal plane, which is that structures of each connecting end have a uniform uniformity, so as to ensure a good contact performance and easy to insert and extract.

Preferably, the audio-video signal transmission connector in this embodiment further may be a layout design of double layer and multi-layer interface, and is compatible with 1.2 mm and 1.6 mm PCB card, so as to make the connector can be upgrade freely, and save development cost effectively and reduce the cost of production and transportation greatly and so on.

It should be noticed that the structure charts of FIGS. 1-3 are used solely for identification, the specific structure design can be adjusted or reformed according to actual needs, as long as it can realized functions of the connecting zone based on blind mating.

Embodiment 2

Based on the embodiment 1 and the structure illustrated on FIGS. 1-3, this embodiment provides the structure of the female connection port of the audio-video signal transmission connector.

Figure 4:
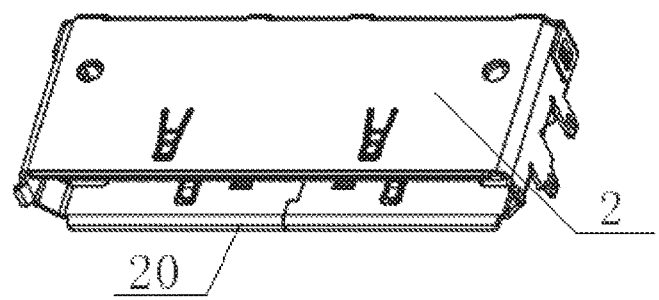
FIG. 4 is a structure diagram of the female connection port of the audio-video signal transmission connector.
Figure 5:
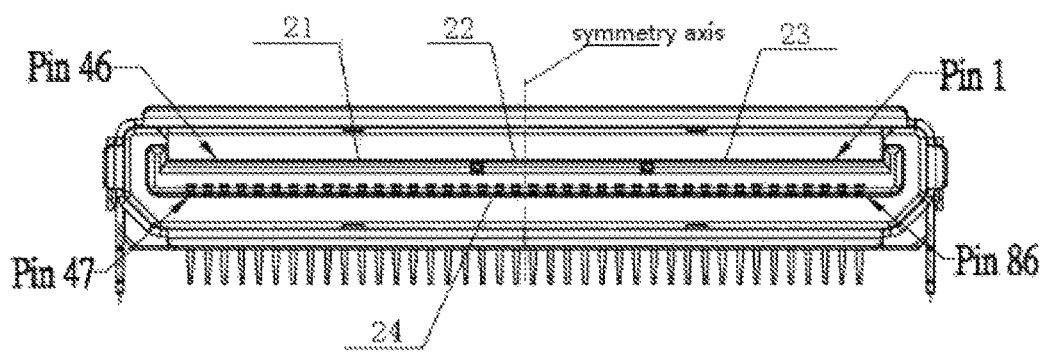
FIG. 5 is a structure diagram of the female connection port of the audio-video signal transmission connector in FIG. 4.
Figure 6:
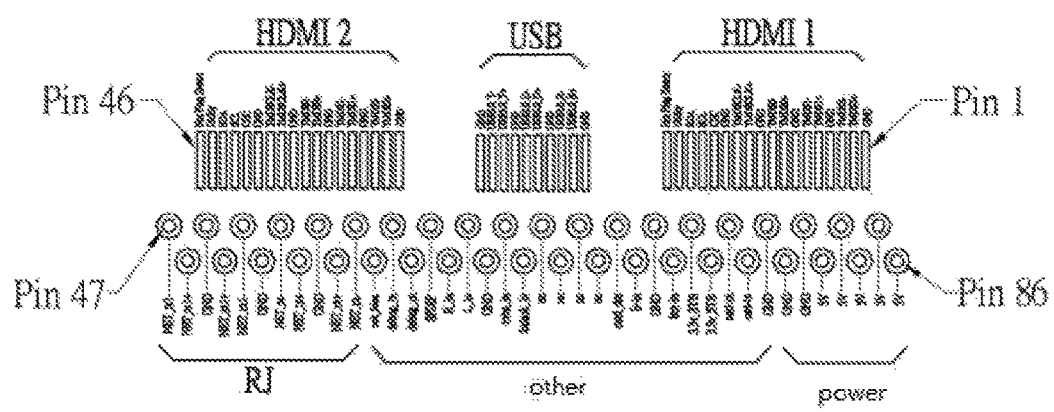
FIG. 6 is a schematic diagram of the pins of the female connection port in FIG. 4 and/or FIG. 5.

FIG. 4 is a structure diagram of the female connection port of the audio-video signal transmission connector, FIG. 5 is a structure diagram of the female connection port of the audio-video signal transmission connector in FIG. 4, and FIG. 6 is a schematic diagram of the pins of the female connection port in FIG. 4 and/or FIG. 5; referring to FIGS. 4-6, the female connection port 20 of the audio-video signal transmission connector 2 is arranged corresponding to the male connection port 10 in the above embodiment, which is that the pins (slots) in the female connection port 20 insert and connect with the pins (contact pins) in the male connection port, so as to realize the transmission of the audio-video signal data.

Due to the female connection port 20 matches with the male connection port 10 of the embodiment 1, so that the relative technical features of the male connection port 10 in the above mentioned embodiment can be changed adaptively to apply to the technical features in this embodiment, not repeat them here.

Referring to FIGS. 2-6, the first HDMI interface unit 21 and the second HDMI interface unit in the female connection port 20 of this embodiment also comprises consecutively arranged pins (pin01-pin18, pin29-pin46), the USB interface unit comprises 10 consecutively arranged pins (pin19-pin28), the power interface unit (refer to the power in FIG. 2) comprises 7 consecutively arranged pins (pin80-pin86), RJ interface unit (refer to "RJ" in FIG. 2) also comprises 11 consecutively arranged pins (pin47-pin57), and the other interface unit (referring to "the other port" in FIG. 2) comprises 22 consecutively arranged pins (pin58-pin79), the female connection port 20 also comprises 86 pins (pin01-pin86) corresponding to the male connection port 10, and the corresponding interface unit and the pins all have the same performance.

In summary, the connector user for transmission of audio-video signal in the embodiment, due to its high integration, a lot of functions are available to it, so that it is easy to expand; and through partition and integration arrangement of the audio-video transmission connector in TV or in other electric devices, signal cross-talk among each zones can be effectively avoided, and the connecting end faces of the connecting zones can be located in the same horizontal plane, so as to make the connector easier to connect the other component, and contact reliable and not easy to loose, meanwhile it is benefit for welding procedure and controlling the smoothness during the production, then effectively avoid producing defects such as head back down or deviation and so on, and it well adapt to manual welding technique, so as to reduce the difficulty of welding repair which benefits the control of welding quality; in addition, the connector applied for audio-video signal transmission can also be suitable for high performance signal transmission, and has strong conductive ability, so as to make it more expandable.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. An audio-video signal transmission connector, applied to transmission of audio-video signal, wherein the audio-video signal transmission connector is provided with a connection port for connecting to other components, and the connection port comprises:
    multiple connecting zones, adjacent connecting zones all being provided with a signal isolation layer to isolate electrical signal between the adjacent connecting zones,
    wherein, each of the multiple connecting zones comprises at least one interface unit;
    wherein the multiple connecting zones comprise:
        a first connecting zone, comprising a first HDMI interface unit, a second HDMI interface unit, and a USB interface unit, and
        a second connecting zone, comprising a power interface unit, an RJ interface unit, and other interface units, and
        wherein, the first connecting zone and the second connecting zone are arranged in parallel and axial symmetry, any two of the second connecting zone, the first HDMI interface unit, the second HDMI interface unit, and the USB interface unit are isolated from each other by the signal isolation layer.

2. The audio-video signal transmission connector claimed in claim 1, wherein connecting end faces of the multiple connecting zones are all located in a same horizontal plane.

3. The audio-video signal transmission connector claimed in claim 1, wherein the connection port is a female connection port or a male connection port.

4. The audio-video signal transmission connector claimed in claim 1, wherein the first HDMI interface unit and the second interface unit both comprise:
    at least one HDMI 2.0 interface, and each HDMI 2.0 interface is compatible with standard data transmission of HDMI 1.4.

5. The audio-video signal transmission connector claimed in claim 1, wherein bandwidths of the signal transmitted by the first HDMI interface unit and the second HDMI interface unit is both less than or equal to 27 Gbps.

6. The audio-video signal transmission connector claimed in claim 1, wherein the USB interface unit comprises:
    at least one USB 3.0 interface, and each USB 3.0 interface is compatible with standard data transmission of the multiple USB 2.0.

7. The audio-video signal transmission connector claimed in claim 1, wherein the power interface unit comprises:
    at least one power interface unit, and each power interface unit is provided with multiple pins, and
    wherein, current of each of the pins of the power interface unit is less than or equal to 1.2 A.

8. The audio-video signal transmission connector claimed in claim 1, wherein the RJ interface unit comprises:
    at least one gigabit network interface, and each gigabit network interface is compatible with 100 M network standard data transmission.

9. The audio-video signal transmission connector claimed in claim 1, wherein the other interface units comprise:
an analog signal interface, configured to transmit analog signal.

10. The audio-video signal transmission connector claimed in claim 3, wherein each interface unit comprises multiple pins, functions of two adjacent pins located in a same interface unit can be replaced mutually; and
a connection interface of the female connection port or a connection interface of the male connection port comprises 86 pins.

11. The audio-video signal transmission connector claimed in claim 1, wherein each interface unit comprises multiple pins, functions of two adjacent pins located in a same interface unit can be replaced mutually.

12. The audio-video signal transmission connector claimed in claim 11, wherein a connection interface of the connection interface port comprises 86 pins.

13. The audio-video signal transmission connector claimed in claim 12, wherein the first HDMI interface unit and the second HDMI interface unit both comprise 18 consecutively arranged pins, the USB interface unit comprises 10 consecutively arranged pins, the power interface unit comprises 7 consecutively arranged pins, the RJ interface unit comprises 11 consecutively arranged pins, and the other interface units comprise 22 consecutively arranged pins, and
wherein, the first HDMI interface unit and the second HDMI interface unit are distributed symmetrically on two sides of the USB interface unit, the power interface unit and the RJ interface are distributed on two sides of the other interface units, and the first connecting zone is arranged parallel to the second connecting zone.

14. The audio-video signal transmission connector claimed in claim 1, wherein the first HDMI interface unit, the second HDMI interface unit, the USB interface unit, the power interface unit, the RJ interface unit and the other interface units comprise multiple pins, functions of two adjacent pins located in a same interface unit can be replaced mutually.

15. The audio-video signal transmission connector claimed in claim 4, wherein the at least one HDMI 2.0 interface comprises multiple pins, functions of two adjacent pins located in a same interface unit can be replaced mutually.

16. The audio-video signal transmission connector claimed in claim 6, wherein the USB 3.0 interface comprises multiple pins, functions of two adjacent pins located in a same interface unit can be replaced mutually.

17. The audio-video signal transmission connector claimed in claim 14, wherein a connection interface of the connection interface port comprises 86 pins.

18. The audio-video signal transmission connector claimed in claim 15, wherein a connection interface of the connection interface port comprises 86 pins.

19. The audio-video signal transmission connector claimed in claim 16, wherein a connection interface of the connection interface port comprises 86 pins.

* * * * *